United States Patent
Stark et al.

(10) Patent No.: US 10,465,273 B2
(45) Date of Patent: Nov. 5, 2019

(54) SURFACE GRAPHENIZATION OF A METALLIC OR METALLIZED REINFORCEMENT BY FLAME SPRAY PYROLYSIS

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Wendelin Jan Stark, Langenthal (CH); Robert Nikolaus Grass, Zurich (CH); Milan Fedurco, Clermont-Ferrand (FR); Antonio Delfino, Clermont-Ferrand (FR); Jean-Paul Meraldi, Zurich (CH)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 278 days.

(21) Appl. No.: 15/319,545

(22) PCT Filed: May 20, 2015

(86) PCT No.: PCT/EP2015/061166
§ 371 (c)(1),
(2) Date: Dec. 16, 2016

(87) PCT Pub. No.: WO2015/193050
PCT Pub. Date: Dec. 23, 2015

(65) Prior Publication Data
US 2017/0121806 A1 May 4, 2017

(30) Foreign Application Priority Data
Jun. 18, 2014 (FR) ..................... 14 55568

(51) Int. Cl.
*C23C 16/00* (2006.01)
*C23C 4/129* (2016.01)
(Continued)

(52) U.S. Cl.
CPC ............ *C23C 4/129* (2016.01); *B60C 9/00* (2013.01); *C01B 32/184* (2017.08);
(Continued)

(58) Field of Classification Search
None
See application file for complete search history.

(56) References Cited

U.S. PATENT DOCUMENTS 5,958,361 A  9/1999 Laine et al.
6,887,566 B1 5/2005 Hung et al.
(Continued)

FOREIGN PATENT DOCUMENTS

DE   10 2012 109 260 A1   1/2014
WO        01/36332 A1     5/2001
(Continued)

OTHER PUBLICATIONS

W. S. Fulton, "Steel Tire Cord-Rubber Adhesion, Including the Contribution of Cobalt", Rubber Chemistry and Technology, vol. 78, pp. 426-457 (2004).
(Continued)

*Primary Examiner* — Mandy C Louie
(74) *Attorney, Agent, or Firm* — Venable LLP

(57) ABSTRACT

A process for depositing, with forward progression, graphene on the surface of a metallic or metallized continuous reinforcer, at the periphery of which is positioned a layer of surface metal chosen from copper, nickel and copper/nickel alloys, comprises at least one stage of flame spray pyrolysis ("FSP"), under a reducing atmosphere, of a carbon precursor which generates, in the flame, at least one carbon-based gas
(Continued)

Figure 1:
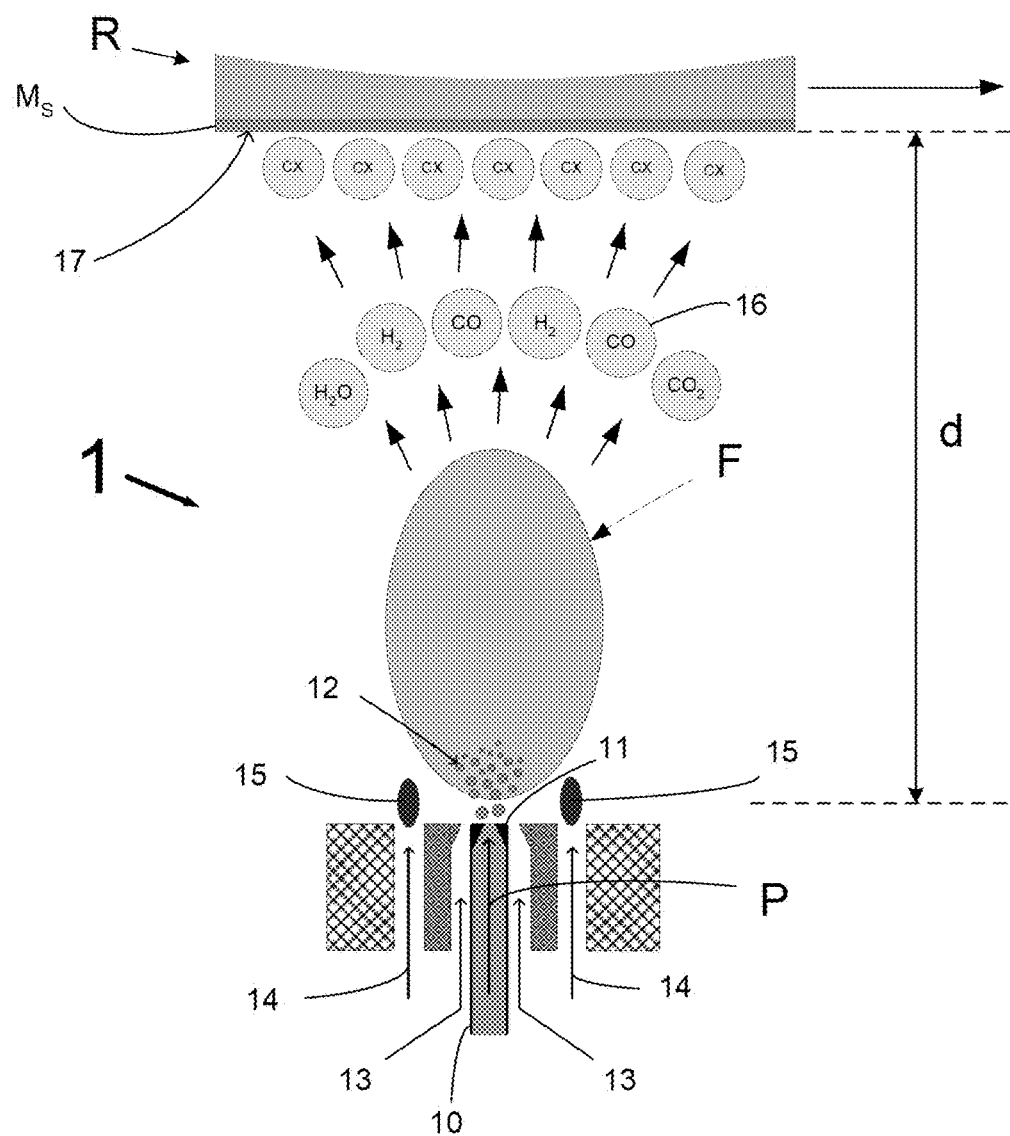

such as carbon monoxide which is sprayed onto the surface of the reinforcer in forward progression, and is decomposed thereon to form one or more graphene layers at the surface of the surface metal; an additional stage of graphene functionalization makes it possible to adhere the reinforcer to a polymer matrix such as rubber.

32 Claims, 6 Drawing Sheets

(51) Int. Cl.
  *D07B 1/06* (2006.01)
  *C23C 4/04* (2006.01)
  *C01B 32/184* (2017.01)
  *C01B 32/194* (2017.01)
  *B60C 9/00* (2006.01)

(52) U.S. Cl.
  CPC .............. *C01B 32/194* (2017.08); *C23C 4/04* (2013.01); *D07B 1/0666* (2013.01); *B60C 2009/0014* (2013.01); *D07B 2201/2011* (2013.01); *D07B 2201/2013* (2013.01); *D07B 2205/3007* (2013.01); *D07B 2205/3021* (2013.01); *D07B 2205/3067* (2013.01); *D07B 2205/3071* (2013.01); *D07B 2205/3085* (2013.01); *D07B 2205/3089* (2013.01); *D07B 2205/3092* (2013.01)

(56) References Cited

U.S. PATENT DOCUMENTS

| | | |
|---|---|---|
| 7,211,236 B2 | 5/2007 | Stark et al. |
| 8,182,573 B2 | 5/2012 | Stark et al. |
| 8,231,369 B2 | 7/2012 | Rajala et al. |
| 8,658,188 B2 | 2/2014 | Stark et al. |
| 2004/0126298 A1 | 7/2004 | Stark et al. |
| 2008/0268246 A1 | 10/2008 | Stark et al. |
| 2009/0123357 A1 | 5/2009 | Chang et al. |
| 2009/0126604 A1 | 5/2009 | Akhtar et al. |
| 2009/0317504 A1 | 12/2009 | Rajala et al. |
| 2010/0055340 A1 | 3/2010 | Park et al. |
| 2011/0314840 A1* | 12/2011 | Jahangiri-Famenini ..................... B82Y 30/00 62/56 |
| 2012/0148646 A1 | 6/2012 | Stark et al. |
| 2013/0143067 A1 | 6/2013 | Kim et al. .................... 428/634 |
| 2015/0307981 A1 | 10/2015 | Grass et al. |
| 2015/0352900 A1 | 12/2015 | Delfino et al. |
| 2017/0137993 A1 | 5/2017 | Grass et al. |

FOREIGN PATENT DOCUMENTS

| | | |
|---|---|---|
| WO | 2004/005184 A1 | 1/2004 |
| WO | 2004/103900 A1 | 12/2004 |
| WO | 2007/028267 A1 | 3/2007 |
| WO | 2008/049954 A1 | 5/2008 |
| WO | 2011/020204 A1 | 2/2011 |

OTHER PUBLICATIONS

B. Thiebaut, "Flame Spray Pyrolysis: A Unique Facility for the Production of Nanopowders", Platinum Metals Rev., vol. 55, No. 2, pp. 149-151 (2011).
K. Kim, et al., "Raman Spectroscopy Study of Rotated Double-Layer Graphene: Misorientation-Angle Dependence of Electronic Structure", Phys. Rev. Lett., vol. 108, pp. 246103-1-6 (2012).
Y. Wang, et al., "Raman Studies of Monolayer Graphene: The Substrate Effect", J. Phys. Chem. C., vol. 112, pp. 10637-10640 (2008).
International Search Report dated Aug. 6, 2015, issued by EPO in connection with International Application No. PCT/EP2015/061166.

* cited by examiner

— 2 nm

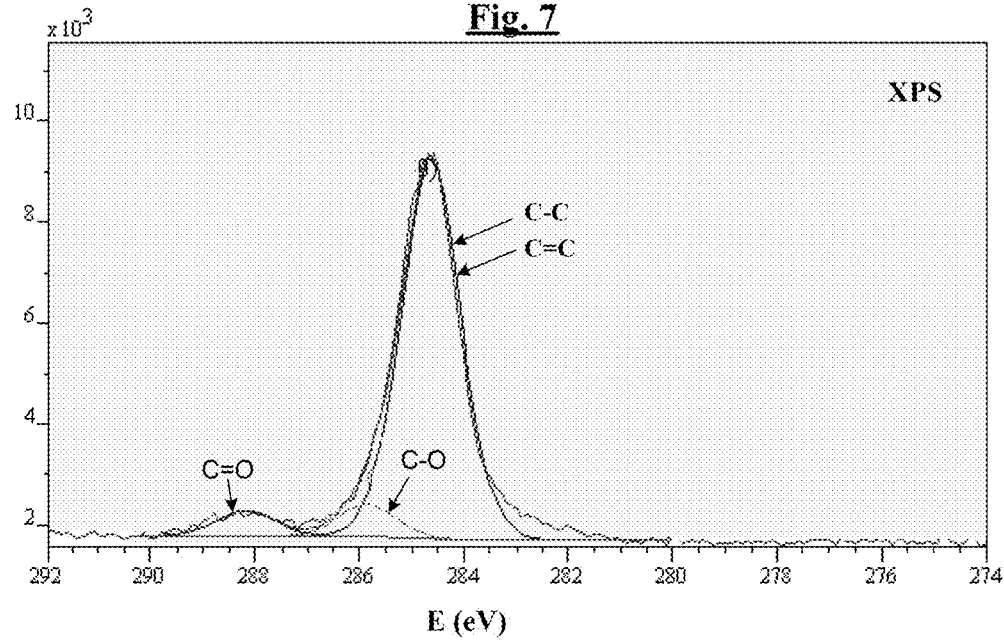
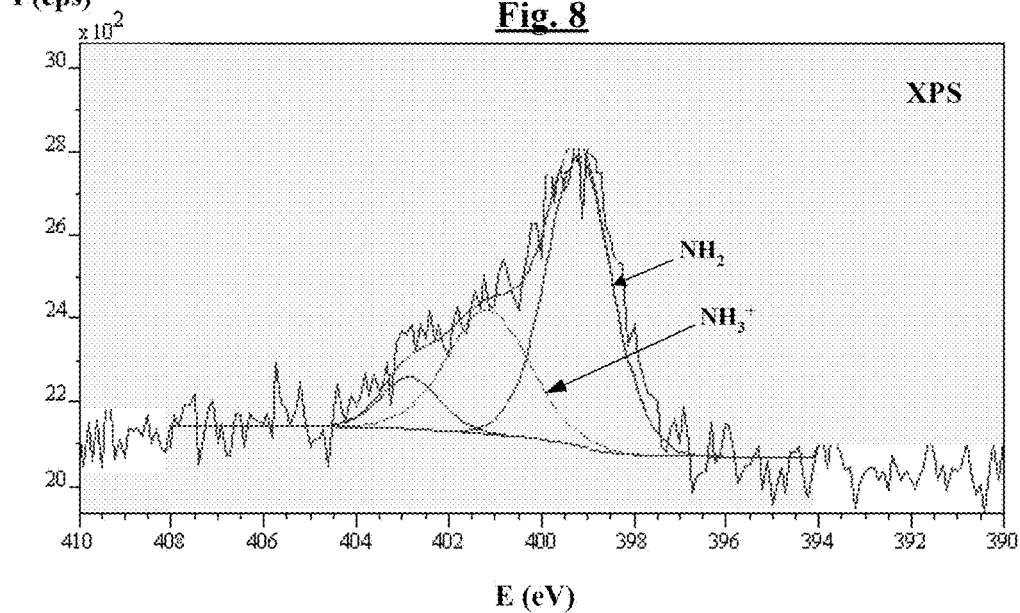

SURFACE GRAPHENIZATION OF A METALLIC OR METALLIZED REINFORCEMENT BY FLAME SPRAY PYROLYSIS

1. FIELD OF THE INVENTION

The present invention relates to processes for treating metallic or metallized reinforcers, that can be used as reinforcing elements of matrices made of polymer such as, for example, rubber, in particular in pneumatic or non-pneumatic tyres for vehicles.

It relates more particularly to the processes for surface treatment of such reinforcers for the purpose, on the one hand, of protecting them from corrosion and, on the other hand, of making it possible for them to subsequently adhere to ethylenically unsaturated polymer matrices, such as natural rubber, in particular without the use of cobalt salts in these polymer matrices being necessary.

2. PRIOR ART

Composites of metal/rubber type, in particular for tyres, are well known. They are generally composed of a matrix made of unsaturated rubber, generally diene rubber, which can be crosslinked with sulphur, comprising metallic reinforcing elements (or "reinforcers"), such as wires or cords made of carbon steel.

As they are subjected to very high stresses during the rolling of the tyres, in particular to repeated actions of compression, bending or variation in curvature, these composites must, in a known way, satisfy a large number of sometimes contradictory technical criteria, such as uniformity, flexibility, flexural strength and compressive strength, tensile strength, wear resistance and corrosion resistance, and must maintain this performance at a very high level for as long as possible.

It is easily understood that the adhesive interphase between the rubber and these reinforcers plays a dominating role in the persistence of the above performance.

The conventional process for connecting the rubber compositions to carbon steel consists in coating the surface of the steel with brass (copper/zinc alloy), the bonding between the steel and the rubber matrix being provided by sulphurization of the brass (formation of zinc and copper sulphides) during the subsequent vulcanization (that is to say, three-dimensional crosslinking by sulphur) of the rubber matrix. This sulphurization process is reflected in particular by the in situ formation of metal clusters at the surface of the brass known as "dendrites", around which it is assumed that the rubber matrix will anchor (by mechanical and chemical anchoring) during the vulcanization.

In addition, organic salts or complexes of cobalt are generally incorporated in this rubber matrix as adhesion-promoting additives. It is known that cobalt actively participates not only in the process of vulcanization of the rubber but also in that of dendritization of the brass by being incorporated in the dendrites themselves (by formation of Cu—Zn—Co intermetal sulphides), according to complex mechanisms of redox reactions resulting, it is assumed, in the corrosion of the brass, in the dissolution of the metal and in its redeposition in the form of these metal sulphide dendrites (sulphur-comprising dendrites). Reference may be made, for further details, to the RCT (*Rubber Chemistry and Technology*) publication, Vol. 78, pp. 426-457, author W. Stephen Fulton, entitled "*Steel tire cord-rubber adhesion, including the contribution of cobalt*").

However, it is also known that the presence of these cobalt compounds in rubber compositions renders the latter more sensitive to oxidation and to ageing, so much so that the adhesion between the carbon steel and the rubber matrix is also liable to weaken over time as a result of the gradual development of the sulphides formed, under the effect of the various stresses encountered, in particular mechanical and/or thermal stresses, it being possible for the above decomposition process in addition to be accelerated in the presence of moisture.

Their incorporation also significantly increases the cost of the rubber compositions, not to mention that it is desirable in the long run to eliminate cobalt from these compositions, due to recent developments in European regulations, cobalt and cobalt salts being regarded as relatively toxic to the environment.

For all the reasons set out above, manufacturers of metal/rubber composites, in particular tyre manufacturers, are on the lookout for novel solutions in order to protect the metallic reinforcers from corrosion and to adhesively bond them to the rubber compositions, while overcoming, at least in part, the abovementioned disadvantages.

3. BRIEF DESCRIPTION OF THE INVENTION

In point of fact, during their research studies, the Applicant Companies have found a novel surface treatment process corresponding to the above objective.

The present invention relates to a process for depositing, with forward progression, at least one layer of graphene on the surface of a metallic or metallized continuous reinforcer, at the periphery of which is positioned a layer of metal referred to as "surface metal" chosen from copper, nickel and copper/nickel alloys, said process comprising at least one stage of flame spray pyrolysis, under a reducing atmosphere, of a carbon precursor which generates, in the flame, at least one carbon-based gas which is sprayed onto the surface of the reinforcer in forward progression, and is decomposed thereon to form the said graphene layer at the surface of the surface metal.

Thus, and entirely unexpectedly, by "simple" passage through a flame of appropriate composition, it has proved to be possible to continuously graphenize metallic or metallized reinforcers and to thus effectively protect them their surface, in particular from corrosion.

According to a particularly preferred embodiment of the invention, once the graphene has been deposited on the reinforcer (that is to say, the reinforcer has been graphenized), the latter is treated for the purpose of grafting to the graphene at least one functional group which can crosslink to a polymer matrix, thus rendering the reinforcer capable of directly reinforcing this polymer matrix.

The reinforcers treated according to the process of the invention have as major advantage that of being effectively protected from corrosion, and also of being able subsequently to be adhesively bonded directly, that is to say without adhesion primer or addition of metal salt (in particular of cobalt salt), to unsaturated rubber matrices, such as natural rubber.

While the deposition of a surface metal is admittedly necessary, this technology is simplified with respect to the prior art (brass coating for adhesive bonding to the rubber) as it does not require the deposition both of Cu and Zn, followed by a high-temperature thermal diffusion treatment for formation of brass.

The invention and its advantages will be easily understood in the light of the detailed description and exemplary embodiments which follow, and also of the figures relating to these examples, which represent or schematize:

- a scheme illustrating the principle of the FSP process of the invention, and also an example of a device which can be used for the implementation of this process (FIG. 1);
- a scheme illustrating the surface condition of the reinforcer (R), once it has been FSP treated, with formation of graphene (GR) at the surface of the surface metal $M_S$ (FIG. 2);
- another scheme illustrating the surface condition of the reinforcer (R) once graphenized and functionalized, with presence of functionalized graphene (GRf) at the surface of the surface metal $M_S$ (FIG. 3);
- a scheme illustrating the crosslinking and the anchoring of the functionalized graphene (GRf), after reaction of its functional groups, to a polymer matrix (18) (FIG. 4);
- a reproduction of a TEM photograph taken of a graphene sample withdrawn at the surface of a reinforcer treated according to the invention (FIG. 5);
- a Raman spectrum recorded on another graphene sample withdrawn at the surface of a reinforcer treated according to the invention (FIG. 6);
- a reproduction of an XPS spectrum taken at the surface of a metallic reinforcer treated according to the invention, after graphenization, clearly confirming the presence of graphene (FIG. 7);
- a reproduction of another XPS spectrum taken at the surface of a metallic reinforcer treated according to the invention, after graphenization and then functionalization, clearly confirming the functionalization of the graphene by amine $NH_2$ groups (FIG. 8).

4. DETAILED DESCRIPTION OF THE INVENTION

In the present description, unless expressly indicated otherwise, the percentages (%) shown are percentages by weight.

Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

The invention thus relates to a process for depositing, with forward progression, at least one (that is to say one or more) layer of graphene on the surface of a metallic or metallized continuous reinforcer, at the periphery of which is positioned a layer of metal referred to as "surface metal" (denoted "$M_S$" below) chosen from copper, nickel and copper/nickel alloys, said process comprising at least one stage of flame spray pyrolysis, under a reducing atmosphere, of a carbon precursor which generates, in the flame, at least one carbon-based gas which is sprayed onto the surface of the reinforcer in forward progression, and is decomposed thereon to form the said (at least one) graphene layer which is deposited at the surface of the surface metal.

The term "with forward progression" means, of course, that the continuous reinforcer is in relative movement in the direction of its axis.

4.1 Reinforcer

"Continuous reinforcer" is understood to mean, in a way well known to a person skilled in the art, a threadlike object, that is to say elongated object, having a very great length with respect to its section, whatever the shape of this section, for example circular, oblong, rectangular or square, or even flat, this reinforcer, as a result of its great length, being capable of being wound in several turns over a take-up or storage reel; to give an idea, the ratio of its length to the greatest dimension of its cross section is typically greater than $10^3$, preferably greater than $10^4$.

This threadlike reinforcer can be both straight and non-straight, for example twisted or wavy. The thickness (case of a non-circular cross section) of this reinforcer, or its diameter when its cross section is circular in shape, is preferably between 0.05 and 5 mm, more preferably between 0.1 and 1 mm and in particular between 0.12 and 0.50 mm.

According to a specific embodiment, the threadlike reinforcer is an individual thread or an assembly of threads, such as, for example, a cord or a folded yarn, or else a fabric, in particular a twill fabric.

According to another specific embodiment, the threadlike reinforcer is a tape (by convention, having a width of at most 5 cm) or a film (by convention, having a width of greater than 5 cm), the thickness of which, as already indicated above, is preferably between 0.05 and 5 mm, more preferably between 0.1 and 1 mm, in particular between 0.12 and 0.50 mm.

The continuous reinforcer treated according to the invention can be metallic, that is to say entirely of metal, both at the core and at the periphery, or else simply metallized, in the case of a hybrid reinforcer consisting of metal at its periphery and, at the core, of at least one other non-metal material. Thus it is that the reinforcer might be textile, for example made of aramid, of carbon or of glass, but metallized at its periphery by deposition of a coating of metal, identical to or different from the surface metal $M_S$ proper.

Preferably, the reinforcer is a reinforcer entirely metallic, both at the core and at the skin or at the periphery.

More preferably, the metal at the core of the metallic reinforcer is a steel, in particular a carbon steel, it being possible for the latter to be coated or not coated with another optional metal, other than the surface metal $M_S$, consequently positioned between the steel and the surface metal.

The carbon steel is preferably such as normally used in cords of "steel cord" type for tyres; however, it is, of course, possible to use other steels, for example stainless steels. When a carbon steel is used, its carbon content is preferably between 0.4% and 1.2%, in particular between 0.5% and 1.1%. The invention applies in particular to any steel of the normal tensile ("NT"), high tensile ("HT"), super high tensile ("SHT") or ultra high tensile ("UHT") steel cord type.

When the above steel, in particular carbon steel, is coated, at least in part, with a metal referred to as "substrate metal" or "coating metal", consequently acting as substrate for the layer of the surface metal $M_S$, the substrate metal is preferably selected from the group consisting of aluminium, cobalt, tin, manganese, molybdenum, zinc and the alloys comprising at least one of these elements, more preferably selected from the group consisting of cobalt, zinc and the alloys comprising at least one of these elements; this optional substrate metal can in particular be brass.

4.2 Layer of Surface Metal $M_S$

A characteristic common to all reinforcers treated according to the process of the invention is that they are provided at their periphery, prior to the FSP treatment, with a layer of metal referred to as "surface metal" (metal denoted "$M_S$") on which the graphene will be deposited.

This metal $M_S$ is chosen from copper, nickel and the alloys of copper and nickel; preferably, it is copper.

The layer of metal $M_S$ has a thickness which is preferably between 0.1 and 10 μm, more preferably between 0.5 and 5 μm. It can be deposited by any means known to a person skilled in the art, for example by an electrochemical or chemical route.

4.3 Graphenization by FSP

The surface treatment of the invention has the essential characteristic of comprising a stage of flame spray pyrolysis, "FSP" for short (for Flame Spray Pyrolysis), of a carbon precursor which generates, in the flame, at least one carbon-based gas.

The carbon-based gas formed, preferably carbon monoxide (CO), is propelled, sprayed by the flame towards the surface of the body to be treated, hence the name accorded to this technology.

Flame spray pyrolysis is a method well known today which has been essentially developed for the synthesis of ultrafine powders of simple or mixed oxides of various metals (e.g., $SiO_2$, $Al_2O_3$, $B_2O_3$, $ZrO_2$, $GeO_2$, $WO_3$, $Nb_2O_5$, $SnO_2$, MgO, ZnO, $Ce_xZr_{(1-x)}O_2$), having controlled morphologies, and/or their deposition on various substrates, this being the case starting from a great variety of metal precursors, generally in the form of comminutable organic or inorganic liquids which are preferably inflammable; the liquids comminuted in the flame, on being consumed, give off in particular metal oxide nanoparticles which are sprayed by the flame itself onto these various substrates.

The principle of this method has been recalled, for example, in the recent (2011) publication by Johnson Matthey entitled "*Flame Spray Pyrolysis: a Unique Facility for the Production of Nanopowders*", Platinum Metals Rev., 2011, 55 (2), 149-151. Numerous alternative FSP processes and reactors have also been described, by way of examples, in the patents or patent applications U.S. Pat. No. 5,958,361, WO 01/36332 or U.S. Pat. No. 6,887,566, WO 2004/005184 or U.S. Pat. No. 7,211,236, WO 2005/103900, WO 2007/028267 or U.S. Pat. No. 8,182,573, WO 2008/049954 or U.S. Pat. No. 8,231,369, US 2009/0123357, US 2009/0126604, US 2010/0055340 or WO 2011/020204.

However, to the knowledge of the Applicant Companies, the FSP method had never been used to date for the continuous graphenization of metallic or metallized reinforcers, these reinforcers being in particular provided with the surface metal $M_S$ layer described above.

"Carbon precursor" or "carbon-based gas precursor" capable of generating, during its combustion in the flame, at least one carbon-based gas, in particular and preferably carbon monoxide (CO), is understood to mean, in the present patent application, the product which is sprayed into the flame, whatever the form or the presentation of this product. It can be solid (for example in the form of a powder, sprayed into and melted directly in the flame), liquid or else gaseous at ambient temperature (20° C.); preferably, it is liquid or gaseous.

According to a more preferred embodiment, the carbon precursor is gaseous; it is, for example, selected from the group consisting of methane, ethane, propane, acetylene, ethylene and their mixtures.

According to another more preferred embodiment, the carbon precursor is liquid; it is more preferably an aromatic solvent which is liquid at ambient temperature, in particular of the inflammable type; mention will in particular be made of those selected from the group consisting of benzene, toluene, xylene, naphthalene, tetrahydrofuran, ethylhexanoic acid and the mixtures of such compounds.

The FSP treatment can be carried out at any temperature, of course lower than the melting points of the reinforcer (or of one of its constituent elements) and of its surface metal $M_S$. In order to optimize the duration and the effectiveness of the treatment, the temperature of the surface metal $M_S$, during the graphenization, is preferentially between 300° C. and 600° C., preferably between 400° C. and 550° C.

The appended FIG. 1 illustrates, highly diagrammatically, without observing a specific scale, the principle of the FSP (flame spray pyrolysis) process of the invention and also an example of a device (1) which can be used in the implementation of this process.

The principle of the method is to inject a carbon-donating precursor (P) and then to comminute it in a flame (F) using a propellant and oxidizing gas; the combustion of the precursor (P) in the flame (F) makes possible the formation of the targeted entity (in this case, in accordance with the invention, a carbon-based gas).

The device 1 of this example essentially comprises three respective feeds:

atomization means (10, 11), comprising at least one capillary (10) and one nozzle (11) for feeding with fuel or precursor (P), for example in liquid or gaseous form, the role of which is to eject and comminute the precursor, for example in the form of fine droplets (12), the shape of the jet being dictated by the specific atomization conditions; these atomization means (10, 11) are, of course, preceded by a pump of appropriate proportions (in the examples which follow, a gerotor rotary volumetric micropump, model "mzr-2905" from HNP Mikrosysteme GmbH), not represented in this figure for simplicity;

a feed of oxidation gas (13) (using a pump not represented in the diagram) which ejects the oxidizing gas into the outlet region of the feed nozzle (11), the role of which is, on the one hand, to propel the droplets (12) into the flame (F) and, on the other hand, to oxidize the precursor (P) in order to convert it into carbon-based gas;

finally, a feed of support gas (ignition and combustion gas) (14), for example a mixture of methane and oxygen, which feeds two small flames (secondary flames) (15) for their part intended to ignite the droplets (12) of precursor (P) for formation of the main flame (F).

It is thus the flame (F) generated by the combustion gas (14) and the oxidizing gas (13) which constitutes the FSP reactor, a thermal reactor at very high temperature since the temperature inside the flame (F), according to the preferred operating conditions given above, is greater than 300° C., for example between 300° C. and 600° C.

It is the combustion in the flame (F) of the precursor (P) in the presence of oxygen (13) which will generate the targeted carbon-based gas (16) and also other gaseous entities depending on the specific nature of the precursor used, these entities preferably being reducing, as explained in more detail below.

A person skilled in the art will understand that the FSP treatment is in this instance carried out in an atmosphere "depleted in oxygen" (conditions referred to as "reducing flame" or "reducing atmosphere" conditions), that is to say with the minimum of oxygen necessary (the trend is towards incomplete combustion), without which there will be no formation of carbon-based gas (and of other gaseous reducing entities); preferably, the oxygen content in the combustion chamber (measured immediately at the chamber outlet) is less than 200 ppm, in particular within a range from 5 to 200 ppm, preferably less than 100 ppm, in particular within a range from 10 to 100 ppm. The whole of the combustion chamber (in the examples which follow, a simple fitted-out closed glove box) is thus swept with a stream of inert gas, such as nitrogen. The height of the main flame (F) is typically between 5 and 10 cm.

The flame is placed, as a function of the desired intensity of the treatment, at a variable distance from the surface (17) of the surface metal $M_S$ to be treated, which distance a person skilled in the art can easily define as a function of the specific conditions for implementing the FSP treatment. This distance, denoted "d" in FIG. 1, measured between the base of the flame (F) and the surface (17) of the metal $M_S$, is preferably between 30 and 100 mm, preferably between 50 and 80 mm and in particular between 55 and 75 mm.

It is the flame (F), by virtue of its kinetic energy, which acts as propellant for the carbon-based gas (16) towards the surface (17) of the metal $M_S$ to be treated.

Without being committed to this theory, it may be supposed a posteriori that the carbon-based gas (CO) produced in the flame is subsequently hydrogenated to form intermediate carbon-based entities (symbolically denoted "CX" in FIG. 1), which in their turn interact with the surface of the surface metal $M_S$ to form the graphene (in one or more layers).

The duration of the graphenization treatment is typically from a few tenths of a second to a few seconds, as a function of the specific conditions for the implementation of the treatment, in particular according to the rate of forward progression of the reinforcer, of the distance "d" and of the temperature of the flame. By way of example, the rate of forward progression of the reinforcer is between 0.5 cm/s and 50 cm/s, in particular between 1 and 5 cm/s.

The plants which can be used for the implementation of the process of the invention are, of course, not limited to the examples and embodiments described above.

In order to treat, in particular at high speed, large amounts of reinforcers, such as threads, cords, tapes or films, the plants used might, of course, comprise a combination of several flames positioned in line and/or in parallel, which constitutes a major advantage of the present invention. In order to accelerate the treatment, the reinforcers might also be preheated by passing through heating means, such as ovens, or else heated by the Joule effect by passing an electric current through the reinforcers during their graphenization treatment.

Figure 2:
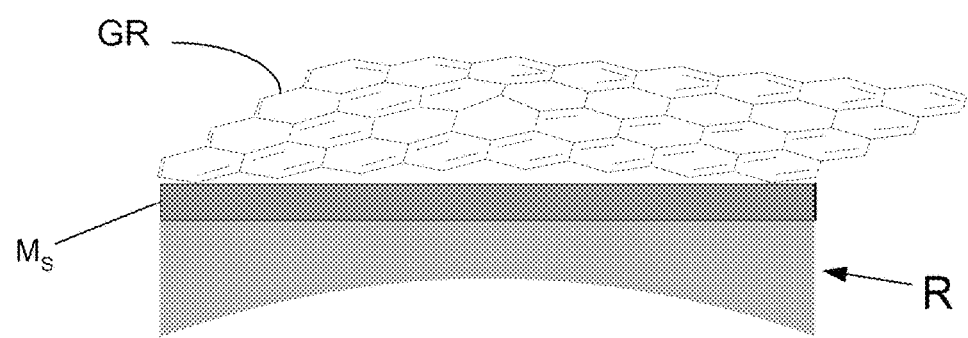

FIG. 2 represents, very diagrammatically, the surface condition of the reinforcer R and of its surface metal $M_S$ once it has been treated by FSP, as indicated above.

To recollect, graphene is a carbon monolayer, in the form of benzene nuclei fused together; it has typically been produced in the past from graphite by mechanical exfoliation. It is a two-dimensional (monoplane) crystal of carbon (hexagonal crystal system); each graphene layer, with a thickness equal to approximately 0.4 nm (nanometer), is essentially composed of $sp^2$ hybridized carbon atoms.

Preferably, in the process of the invention, from 1 to 5 graphene layers, more preferably from 2 to 4 layers are deposited.

In order to give an idea, with an optical microscope, a graphene monolayer absorbs approximately from 1 to 3% of the visible light. If the total graphene (in the form of a "sheet" comprising superimposed layers) is deposited on a transparent support, after having separated it from the reinforcer R, for example by chemical dissolution of the surface metal $M_S$, it is known that the human eye sees through the graphene sheet up to a number of graphene layers equal to 4. Starting from 5 layers, the graphene sheet will appear black.

4.4 Functionalization of the Graphene

According to a particularly preferential embodiment of the invention, once the reinforcer has been graphenized (treated by FSP), the latter is treated, still with forward progression, for the purpose of grafting to the graphene, preferably to the outermost layer if several graphene layers are present, at least one functional group which can crosslink to the polymer matrix which it is intended to reinforce, so as to thus render the said reinforcer capable of adhering by crosslinking to this polymer matrix.

The polymer may or may not be ethylenically unsaturated, it being possible for the crosslinking to take place on the unsaturated polymer, or else on components of the polymer matrix other than the polymer itself.

The process of the invention is particularly implemented on a metallic reinforcer intended to subsequently adhere to an ethylenically unsaturated rubber matrix, such as a diene elastomer, in order to constitute a metal/rubber composite, such as those normally encountered in rubber articles, such as tyres for motor vehicles. The functional group can, for example, be of the vulcanizable type, that is to say crosslinkable via sulphur bridges.

Preferably, the crosslinkable functional group comprises at least one function, denoted "GF" (Graphene Function), chosen from the $-NH_2$, $-NHR$ (R a hydrocarbon radical), $-OH$, $-COOH$, $-CHO$, $-SH$, $-S_x-$ (polysulphide, "x" greater than 1), halogen (in particular $-Cl$, $-Br$, $-F$), acrylate, methacrylate, epoxy, vinyl, vinyloxy or isocyanate functions.

According to a more preferred embodiment, the crosslinkable functional group comprising the "GF" function corresponds to the formula:

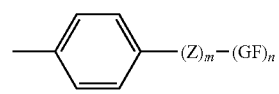

in which:
"m" is equal to 0 or to 1;
"n" is an integer from 1 to 5;
Z is an optional, at least divalent, bonding group (separator or spacer); mention may be made, by way of examples, of an ether $-O-$ bond, a thioether $-S-$ bond, an aliphatic, cycloaliphatic or aromatic hydrocarbon group preferably comprising from 1 to 20 carbon atoms and which can comprise a heteroatom.

According to an even more preferred embodiment, the crosslinkable functional group comprising the "GF" function (in this instance, the primary amine $-NH_2$ function) corresponds to the specific formula which follows:

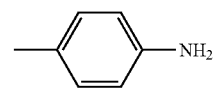

The functionalization of the graphene, that is to say the grafting to the graphene of functional groups comprising at least one "GF" function as described above, can be carried out by any known means, for example by immersion, in particular with forward progression, in a liquid bath of appropriate formulation.

This liquid bath is, for example, a bath of an aqueous solution containing at least one diazonium salt of formula:

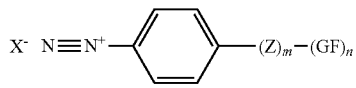

in which Z, GF, "m" and "n" have the definitions already given and $X^-$ represents the anion of the salt, for example chlorine.

In particular, this diazonium salt has the formula:

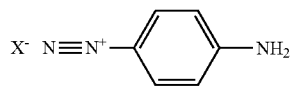

Figure 3:
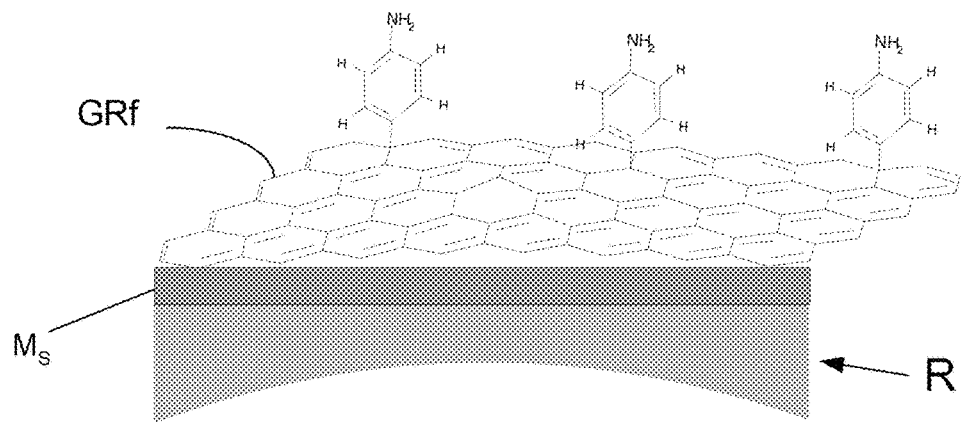

FIG. 3 represents very diagrammatically the surface condition of the reinforcer R and of its surface metal $M_S$ once treated by FSP, that is to say graphenized, and then the outermost graphene layer functionalized (graphene denoted "GRf" in the figure) by treatment in an aqueous bath of the above diazonium salt.

Figure 4:
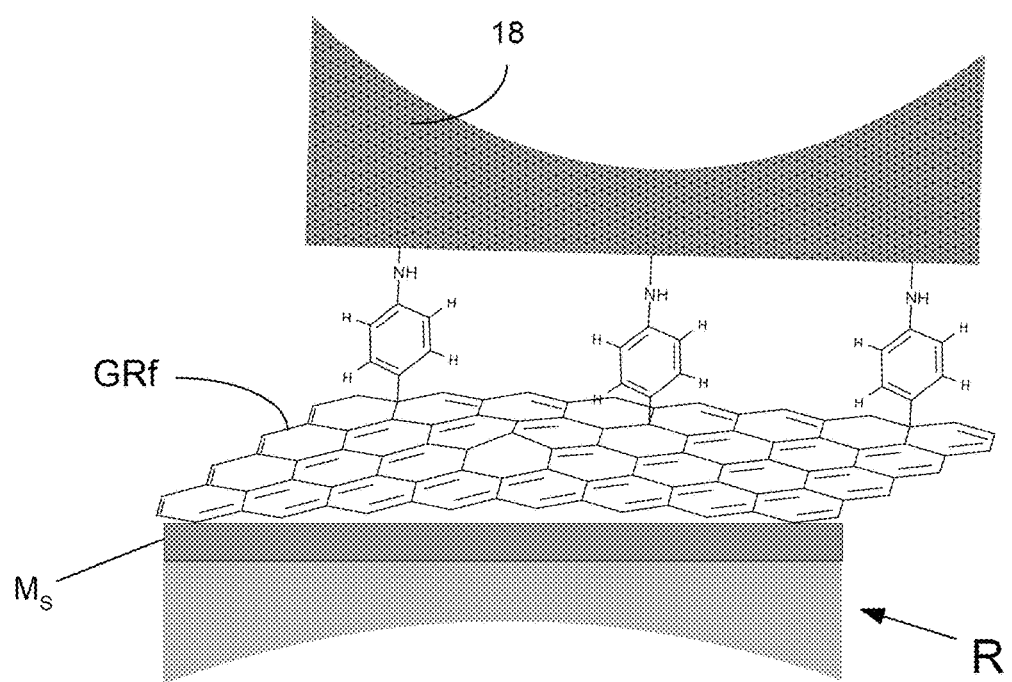

Finally, FIG. 4 is a diagram illustrating very simply the crosslinking, the anchoring of the functionalized graphene (GRf) after reaction of its functional groups (GF) with a polymer matrix (18), such as, for example, epoxidized natural rubber, the epoxy functions of which have reacted with the $—NH_2$ functions of the outermost graphene layer.

5. EXEMPLARY EMBODIMENTS OF THE INVENTION

5.1 Test 1—Graphenization by FSP

During this first test, a brass-coated (Cu/Zn: 60/40) carbon steel thread was subjected to an FSP treatment according to the invention, carried out using the device represented diagrammatically in FIG. 1 (closed glove box swept with a stream of nitrogen) in an atmosphere poor in oxygen ($O_2$ content in the combustion chamber, measured immediately at the chamber outlet, of less then 10 ppm).

Beforehand, this thread with a diameter equal to approximately 0.30 mm (thickness of the brass layer of between 200 and 500 nm) had been cleaned by passing through a 1% aqueous $NH_3$ solution, rinsed with distilled water and dried, everything being under a stream of nitrogen (preferably with the exclusion of air in order to prevent re-oxidation).

This thread, as cathode (−0.5 V with respect to a Ag/AgCl reference electrode), was then subjected to a stage of electrolytic surface copper plating by treatment for approximately 5 s in a bath containing 2 g of copper pyrophosphate hydrate (Aldrich, #34,469-9) and an 85% solution of phosphoric acid in water. A final deposit of a uniform layer of surface metal $M_S$ (copper), with a thickness equal to approximately 3 μm, as attested by SEM (scanning electron microscopy) and by EDS (energy dispersive spectrometry) analyses, was thus obtained, thus perfectly protecting the above thread from corrosion: this is because immersion tests (15 s) in an aqueous bath (solution of water distilled at 100° C.) of sodium thiosulphate ($Na_2S_2O_3$; 5 g/l) and iron(III) nitrate ($Fe(NO_3)_3$; 60 g/l) have revealed the absence of change in colour on the thread thus copper-plated, whereas a control thread (non-copper-plated) exhibited strong surface darkening due to its corrosion.

The thread thus copper-plated, controlled by an automatic device, was then sent through an FSP reactor at a rate of approximately 10 mm/s and at a distance "d" from the flame (F) equal to approximately 70 mm. The combustion chamber (1) was in this instance continuously fed with approximately 5 ml/min of a liquid precursor (P) (mixture of 34% THF and 66% 2-ethylhexanoic acid), 5 l/min of oxygen (oxidation gas 13) and a mixture of methane and oxygen (support gas 14) ($CH_4$: 1.5 ml/min; $O_2$: 2.4 ml/min). The height of the flame (F) was between 6 and 7 cm and the temperature inside the flame was equal to approximately 500° C.

In the present exemplary embodiment and for the various operating conditions above, the combustion and the oxidation of the precursor (P) resulted in a gaseous composition, measured immediately at the chamber outlet by mass spectrometry ("Pfeiffer Quadstar 100") which was as follows (molar %): 1% $H_2O$, 1% $H_2$, 0.5% $CO_2$ and less than 100 ppm $O_2$; furthermore, as the flame produces sufficient CO, no addition of such a gas was necessary.

The appended FIG. 5 reproduces a very-high-resolution transmission electron microscope photograph ((TEM-FEG from FEI; power 300 kV; magnification 620 000) taken of a graphene sample withdrawn at the surface of the thread thus treated, by complete dissolution (overnight) of the surface metal $M_S$ in an aqueous solution (6 ml per graphene sample) of $FeCl_3$ (1M); this solution, which became reddish, was subsequently progressively (5 times), slowly, replaced with water until a clear solution was obtained, avoiding the withdrawal of all of the solution and also any contact with the graphene, this process leaving at the end a very thin sheet of graphene floating freely at the surface of the water.

Figure 5:
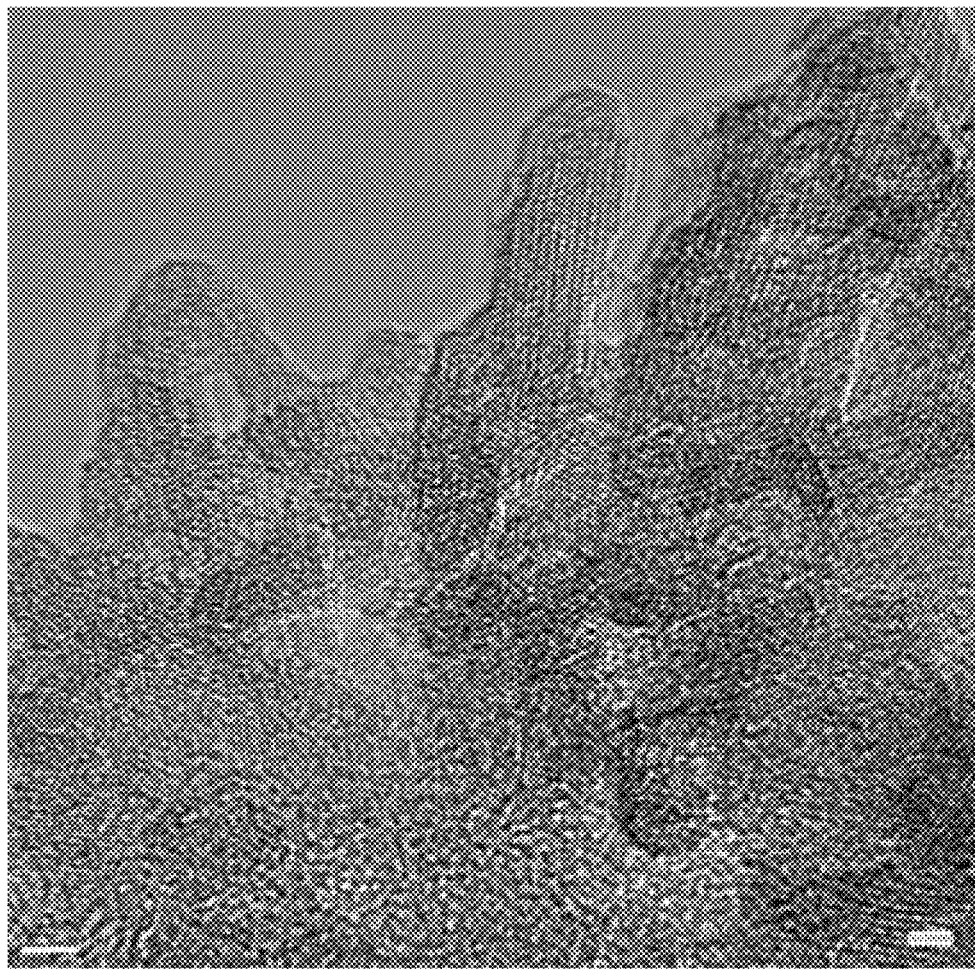

In this photograph of FIG. 5, a distance of 7 mm represents 2 nm; this photograph clearly reveals the carbon atoms (in the form of a hexagonal network) of the withdrawn graphene sheet, this sheet existing here in the form of superimposed monolayers, the number of which is estimated as equal to 1 to 3, depending on the part of the photograph considered.

Figure 6:
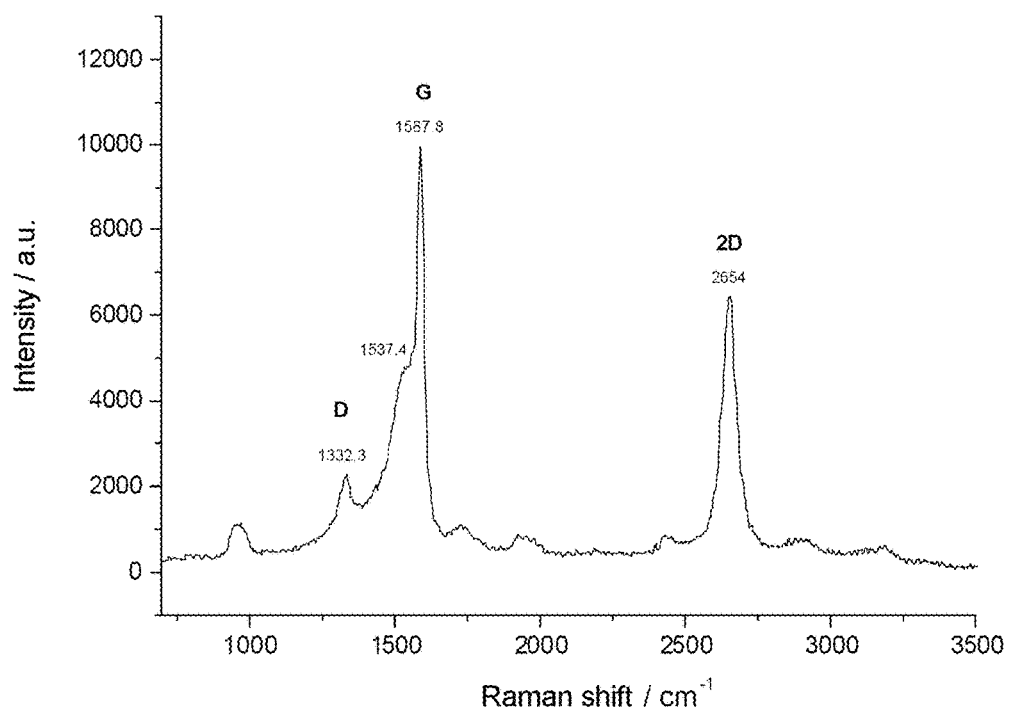

FIG. 6 for its part reproduces a Raman spectrum (confocal micro-Raman spectroscope "CRM 200" from Witec) recorded at 532 nm (2.33 eV excitation; YAG-Nd laser) on another graphene sample (sheet) withdrawn at the surface of the FSP-treated thread as indicated above and deposited on a silicon wafer. The intensity of the signal (in arbitrary units) is indicated on the ordinate and the Raman shift (in $cm^{-1}$) is indicated on the abscissa.

This spectrum is the typical signature of graphene, in particular clearly distinguishing the latter from graphite; this is because the shapes and the positions of the two peaks at approximately 1588 $cm^{-1}$ and 2654 $cm^{-1}$ clearly confirm the presence of graphene in the $sp^2$ hybridized form.

More specifically, the very narrow peak at 1587.8 $cm^{-1}$ (G band) with a mid-height width of approximately 30 $cm^{-1}$ corresponds to a graphene monolayer. The other peak (2D band) at 2654 $cm^{-1}$, strongly shifted towards the blue, with a mid-height width of 60 $cm^{-1}$, corresponds instead to two superimposed graphene monolayers. The ratio of intensities $I_G/I_{2D}$, greater than 1, is explained by an increased resonance of the G band caused by strong coupling between two differently oriented graphene layers, as may already be perceived by the preceding TEM analysis (FIG. 5).

For the analysis and identification of graphene by Raman spectroscopy, a person skilled in the art may usefully refer to the following publications:

Y. Y. Wang, Z. H. Ni, T. Yu, Z. X. Shen, H. M. Wang, Y. H. Wu, W. Chen and A. T. S., "*Raman Studies of Monolayer Graphene: The Substrate Effect*", J. Phys. Chem. C, 2008, 112, 10637-10640;

K. Kim, S. Coh, L. Z. Tan, W. Regan, J. M. Youk, E. Chatterjee, M. F. Crommie, M. L. Cohen, S. G. Louie and A. Zettl. "*Raman Spectroscopy Study of Rotated Double-Layer Graphene: Misorientation-Angle Dependence of Electronic Structure*"; Phys. Rev. Lett., 2012, 108, 246103, 1-6.

Finally, FIG. 7 reproduces an XPS (X-ray photoelectron spectroscopy) spectrum (Axis Ultra device from Kratos; X-ray source: monochromatic Al Kα (1486.6 eV), 10 mA, 15 kV; ultra-high vacuum less than $10^{-8}$ Torr) taken at the surface of the reinforcer with, on the ordinate, the relative intensity of the signal (in counts/s) and, on the abscissa, the binding energy (in eV). In a known way, this type of analysis makes it possible to access the chemical composition of the surface of the material analysed over a depth of several nanometers, in comparison with known spectra.

The main peak observed at approximately 284.6 eV is in fact the superimposition of two very close peaks, the first at approximately 284.3 eV typical of C=C bonds and the second at approximately 285.1 eV typical of C—C bonds, everything clearly testifying to the presence of graphene ($sp^2$ hybridized graphene) at the surface of the surface metal $M_S$ (copper).

5.2 Test 2—Functionalization of the Graphene 0.2 g of p-phenylenediamine and 0.2 g of sodium nitrite, followed by 0.5 ml of hydrochloric acid (36%), were added to 250 ml of water, for formation of the diazonium salt with the formula described above (X representing, in this example, the Cl⁻ anion):

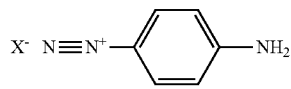

A sample of the above graphenized thread was then subjected to functionalization (amination) of the graphene by immersion for 2 min in the above aqueous solution stirred using a magnetic bar. The thread thus treated was subsequently extracted from the solution, copiously rinsed with water and then dried under a stream of nitrogen.

FIG. 8 reproduces the XPS spectrum taken at the surface of the reinforcer graphenized and then functionalized. This spectrum clearly confirms the functionalization of the graphene, the two main peaks observed after deconvolution (91% of the total surface area of the 3 visible peaks) being typical of the presence of nitrogen. The peak of highest intensity, at approximately 399 eV, reveals in particular the presence, in a large amount, of $NH_2$ functions attached to an aromatic nucleus.

5.3 Test 3—Crosslinking to a Polymer Matrix

Finally, sections of the carbon steel thread thus treated by FSP, once covered with graphene and then the graphene functionalized, were sandwiched between two layers of a rubber composition for formation of a multilayer laminate.

This conventional rubber composition for a belt reinforcement of a passenger vehicle tyre was based on epoxidized (degree of epoxidation of approximately 25 mol %) diene elastomer (natural rubber), on carbon black and silica as filler and on a vulcanization system (sulphur and sulphenamide accelerator), this composition been devoid of cobalt salt.

The metal/rubber composite test specimen thus prepared was then placed under a press and everything was cured at 165° C. for 30 min under a pressure of 20 bar.

After vulcanization of the rubber, excellent adhesive bonding between the rubber matrix and metallic reinforcer was obtained, despite the absence of cobalt salt in the rubber matrix; this is because, during peel tests carried out at ambient temperature (20° C.), it was found that the failure occurred systematically in the rubber matrix itself and not at the interface between (graphenized) metal and rubber.

During comparative tests, carried out under the same conditions (no cobalt salt in the rubber matrix) apart from the absence of treatment according to the invention (combined graphenization by FSP and functionalization), it was found that the metallic reinforcer did not adhesively bond at all to the rubber.

In conclusion, by virtue of the process of the invention, the treated reinforcers can be efficiently protected from corrosion by virtue of the graphene present at their surface; advantageously, they can be adhesively bonded directly, without adhesion primer or addition of metal salt (in particular of cobalt salt), to unsaturated rubber matrices, such as natural rubber, by virtue of the possible functionalization of this graphene.

The invention claimed is:

1. A process for depositing, with forward progression, at least one layer of graphene on the surface of a metallic or metallized continuous reinforcer, at the periphery of which is positioned a layer of surface metal selected from the group consisting of copper, nickel and copper/nickel alloys, said process comprising:
   at least one stage of flame spray pyrolysis, under a reducing atmosphere, of a carbon precursor which generates, in the flame, at least one carbon-based gas which is sprayed onto the surface of the reinforcer in forward progression and is decomposed thereon to form the at least one graphene layer at the surface of the surface metal.

2. The process according to claim 1, wherein the carbon precursor is gaseous.

3. The process according to claim 2, wherein the gaseous carbon precursor is selected from the group consisting of methane, ethane, propane, acetylene, ethylene and mixtures thereof.

4. The process according to claim 1, wherein the carbon precursor is liquid.

5. The process according to claim 4, wherein the liquid carbon precursor is an aromatic solvent.

6. The process according to claim 4, wherein the aromatic solvent is selected from the group consisting of benzene, toluene, xylene, naphthalene, tetrahydrofuran, ethylhexanoic acid and mixtures thereof.

7. The process according to claim 1, wherein the carbon-based gas comprises carbon monoxide.

8. The process according to claim 1, wherein the surface metal is copper.

9. The process according to claim 1, wherein the temperature of the surface metal of the reinforcer in forward progression is between 300° C. and 600° C.

10. The process according to claim 9, wherein the temperature of the surface metal of the reinforcer in forward progression is between 400° C. and 550° C.

11. The process according to claim 1, wherein the distance between the base of the flame and the surface metal of the reinforcer in forward progression is between 30 and 100 mm.

12. The process according to claim 11, wherein the distance between the base of the flame and the surface metal of the reinforcer in forward progression is between 50 and 80 mm.

13. The process according to claim 1, wherein the rate of forward progression of the reinforcer is between 0.5 cm/s and 50 cm/s.

14. The process according to claim 13, wherein the rate of forward progression of the reinforcer is between 1 cm/s and 5 cm/s.

15. The process according to claim 1, wherein the reinforcer is an individual thread or of an assembly of threads.

16. The process according to claim 1, wherein the reinforcer is a tape or a film.

17. The process according to claim 1, wherein the reinforcer is an entirely metallic reinforcer.

18. The process according to claim 17, wherein the metal at the core of the metallic reinforcer is a steel.

19. The process according to claim 18, wherein the steel is a carbon steel.

20. The process according to claim 18, wherein the steel is coated, at least in part, with a substrate metal which serves as substrate for the layer of the surface metal.

21. The process according to claim 20, wherein the substrate metal is selected from the group consisting of aluminum, cobalt, tin, manganese, molybdenum, zinc and alloys comprising at least one of these elements.

22. The process according to claim 21, wherein the substrate metal is selected from the group consisting of cobalt, zinc and alloys comprising at least one of these elements.

23. The process according to claim 22, wherein the substrate metal is brass.

24. The process according to claim 1, wherein the thickness of the reinforcer, or its diameter when its cross section is circular in shape, is between 0.05 and 5 mm.

25. The process according to claim 24, wherein the thickness of the reinforcer, or its diameter when its cross section is circular in shape, is between 0.1 and 1 mm.

26. The process according to claim 1, wherein, once the graphene has been deposited on the reinforcer, the latter is treated, with forward progression, for the purpose of grafting to the graphene at least one functional group which can crosslink to a polymer matrix.

27. The process according to claim 26, wherein the functional group comprises at least one function selected from the group consisting of —NH$_2$, —NHR, —OH, —COOH, —CHO, —SH, —S$_x$—, halogen, acrylate, methacrylate, epoxy, vinyl, vinyloxy and isocyanate functions, where R is a hydrocarbon radical and x is greater than one.

28. The process according to claim 27, wherein the functional group corresponds to the formula:

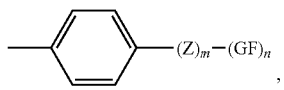

wherein m is equal to 0 or to 1; n is an integer from 1 to 5; and Z is an optional, at least divalent, bonding group.

29. The process according to claim 28, wherein the crosslinkable functional group corresponds to the formula:

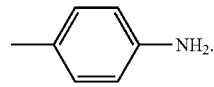

30. The process according to claim 26, wherein the grafting treatment is carried out by passing through a bath.

31. The process according to claim 30, wherein the bath contains an aqueous solution of a diazonium salt of formula,

wherein X$^-$ is the anion of the salt.

32. The process according to claim 31, wherein the diazonium salt corresponds to the formula:

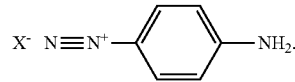

* * * * *